United States Patent Office 3,294,743
Patented Dec. 27, 1966

3,294,743
EPOXY ETHER RESIN-LACTONE COMPOSITIONS
George R. Mack, Allentown, Pa., assignor to General Aniline & Film Corporation, New York, N.Y., a corporation of Delaware
No Drawing. Filed May 12, 1961, Ser. No. 109,516
4 Claims. (Cl. 260—47)

This invention relates to epoxy ether resin compositions containing lactones as reactive diluents.

It is known that the properties of cured epoxy ether resins may be varied over a wide range by incorporating into the uncured system liquid diluents, fillers and other synthetic resins. The diluents reduce the viscosity of the epoxy ether resin so that better penetration in casting and wetting ability in laminate and adhesion formulations may be achieved. The diluents that are employed commercially and those that have been suggested by the art include reactive diluents, i.e. containing epoxy or other reactive groups, such as for example low viscosity glycerol-based resin, phenyl glycidyl ether, butyl glycidyl ether, octylene oxide, styrene oxide, allyl glycidyl ether, dipentene monoxide, alpha-pinene oxide, epichlorohydrin, propylene oxide, triphenylphosphite and the like. The non-reactive diluents include compounds such as xylene, triphenyl phosphate, dibutyl phosphate and the like.

The reactive diluents are preferred over the non-reactive diluents since the latter greatly reduce the strength of the cured resin, volatilize during the curing operation and in general degrade the physical properties of the cured resin because of their tendency to inhibit chain build-up and thus interfere with the development of ultimate properties. Reactive diluents, on the other hand, are generally skin irritants and must be used with care. In addition, they are quite expensive and require additional curing agent.

It is the principal object of the present invention to provide a new class of reactive diluents for polyglycidyl ethers of polyhydric alcohols, commonly referred to as epoxy ether resins, which do not substantially interfere or inhibit the chain building process, do not volatilize during the exothermic heating prior to gelling, are non-irritating to the skin, and are relatively inexpensive.

Other objects and advantages will become more clearly manifest from the following description.

I have found that the foregoing shortcomings are readily overcome by the use of lactones (cyclic ketones) of from 4 to 8 carbon atoms as the reactive diluents. These lactones are, per se, incapable of resinification with conventional curing agents and under the curing conditions normally employed for epoxy ether resins. However, when blended with epoxy ether resins, the lactones in the presence of alkaline or acid catalyst readily open their ring forming the corresponding amides of hydroxy acids which react with epoxy groups of the epoxy ether resin and become an integral part of the cured resin. Prior to curing, the lactones when blended with commercial epoxy ether resins effectually reduce the resin viscosity almost logarithmically proportionally to the concentration used. This is highly desirable where low viscosities are necessary to increase wetting in laminate and adhesive formulations, to increase penetration in casting and encapsulating, and to increase the filler content. Solutions of the epoxy ether resin-lactone are readily cured using any standard alkaline materials including aliphatic and aromatic amines and polyamines or conventional acid catalysts following recommended curing conditions. At room temperature, cures are readily obtained by using aliphatic or aromatic polyamines and the rate of cure is only slightly affected by the lactone concentration.

The lactones utilized in accordance with the present invention have the unique advantage of being much lower in cost and less toxic than the reactive diluents referred to above. Another outstanding feature is the ability of the lactones to react at room temperature with aliphatic polyamines such as ethylene diamine, diethylenetriamine, triethylenetetramine, tetraethylenepentamine, dimethylamino propylamine, diethylamino propylamine, etc. to form amine adduct curing agents. For example, a mixture consisting of a 1:1.2 mole ratio of lactone (or dioxanone) and aliphatic polyamine, respectively, at room temperature, exotherms within a short time to about 90° C. Upon cooling, a clear yellow viscous liquid is obtained which is water soluble and has a pH of 9–11. The range of the latter is dependent upon the lactone and aliphatic polyamine employed. Twenty parts by weight of the amine adduct blended at room temperature into one hundred parts by weight of epoxy ether resin gelled the resin from a few minutes to about 2 hours at about room temperature. The advantages of the amine adduct are that they permit more convenient mixing ratios and are usually less toxic than the parent amine.

The lactones of from 4 to 8 carbon atoms utilized in accordance with the present invention are characterized by the following formulae:

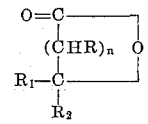

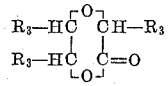

wherein R represents either hydrogen, methyl or ethyl group, $R_1$ represents either hydrogen or methyl, $R_2$ represents either hydrogen, methyl, ethyl or propyl, $R_3$ represents either hydrogen or methyl, and $n$ represents a positive integer of from 2 to 4.

As examples of such lactones, the following are illustrative:

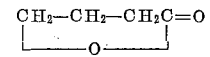
γ-Butyrolactone

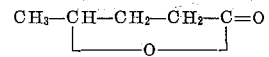
γ-Valerolactone

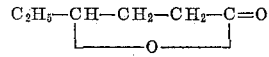
γ-Caprolactone

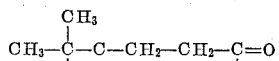
Isocaprolactone

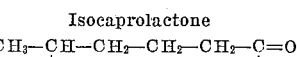
δ-Caprolactone

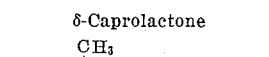
γ-Methyl-γ-caprolactone

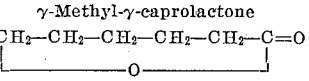
ε-Caprylolactone

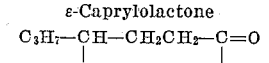
γ-Propyl-γ-butyrolactone

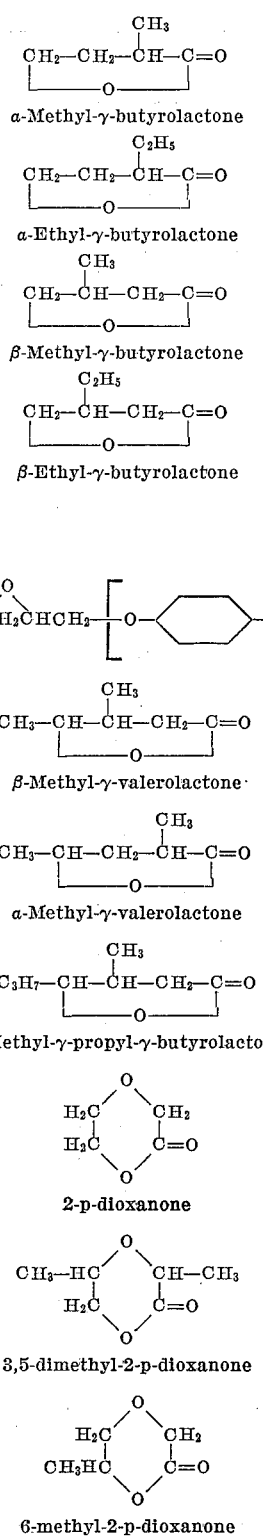

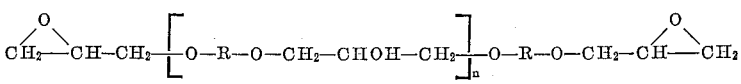

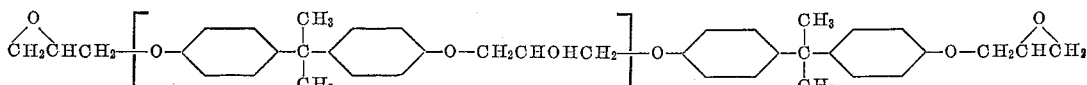

The γ-butyrolactone and the like are commercially available or can be readily prepared in accordance with the procedure outlined in the chemical literature.

The 2-p-dioxanone is commercially available. The 6-methyl and the 3,5'-dimethyl derivatives are prepared in accordance with the procedures of Examples IV and II respectively of U.S. Patent 2,807,629. In lieu of such dioxanones, I may also employ the corresponding 3-morpholone derivatives which are obtained by the conventional reaction of the dioxanone with anhydrous ammonia in a closed system. The improved commercial procedure for preparing 3-morpholinone, 5-methyl-3-morpholinone and 2,6-dimethyl-3-morpholone is described in accordance with the procedure outlined by Raymond L. Mayhew and Samuel A. Glickman in their patent application Serial No. 781,440, filed on December 19, 1958, the teachings of which for the manufacture of such 3-morpholinones is incorporated by reference thereto.

All of the foregoing lactones readily open their ring in the presence of either conventional alkaline or acid catalysts that are normally employed in the curing of epoxy resins and as a consequence form the corresponding amides or hydroxy acids which react in the curing of the epoxy ether resin. At a neutral pH, i.e. of 7, the lactones are stable but when the pH is shifted either below or above 7, the lactone ring opens. In view of this characteristic, the foregoing lactones are ideally suited as reactive diluent in ambient temperature cures.

The epoxy ether resins employed in accordance with the present invention are characterized by the following general formulae:

wherein R represents the divalent hydrocarbon radical of a dihydric phenol and $n$ represents the extent of copolymerization. The epoxide equivalent of the epoxy ether resins may range from 140 to 400. By "epoxy equivalent" as used herein and in the art is meant the grams of the polymeric material or resin containing one gram equivalent epoxide.

The epoxy ether resins are obtained by the procedures described in United States Patents 2,500,600; 2,633,458; 2,642,412; 2,324,483; 2,444,333; 2,520,145; 2,521,911 and 2,651,589; all of which are incorporated herein by reference for examples of the types of epoxy ether resins that may be employed in the process of my invention.

In order to cure or harden the aforestated epoxy ether resins and compositions containing them, various types of curing agents have been proposed, such as alkalies, sodium or potassium hydroxide, alkali-phenoxides like sodium phenoxides; carboxylic acids or anhydrides such as formic acid, oxalic acid or phthalic anhydride; Friedel-Crafts metal halides like aluminum chloride, zinc chloride, ferric chloride or boron trifluoride as well as complexes thereof with ethers, acid anhydrides, ketones, diazonium salts, etc.; phosphoric acid and partial esters thereof including n-butyl orthophosphate, diethyl orthophosphate and hexaethyl tetraphosphate; and amino compounds such as triethyl amine, ethylene diamine, diethyl amine, diethylene triamine, triethylene tetramine, pyridine, piperidine, dicyandiamide, m-phenylenediamine, melamine and the like. These substances are added and mixed with the epoxy resin or composition containing it in order to effect the curing or hardening thereof, the amounts varying considerably depending upon the particular agent or mixture of agents employed.

The following examples will illustrate the utilization of the aforementioned lactones as reactive diluents and the preparation of aliphatic polyamine adducts in the curing of epoxy ether resins. It is to be clearly understood that these examples are merely illustrative and are not to be considered as to be limitive of the invention claimed. All parts are by weight unless otherwise noted.

*Example 1*

An epichlorohydrin bis-phenol A, epoxy ether resin obtained in the commercial market under the brand name "Araldite 6005" having an epoxide equivalent of 190 was divided into 5 portions of varying weight and blended with varying amounts of γ-butyrolactone and a standard amount of diethylene triamine as a catalyst and the blends mixed by hand and allowed to cure at ambient (ca. 20°

C.) temperatures. After 2 hours at room temperature, the various blends were warmed to 60° C. for 2 hours and the Barcol hardness as well as weight loss after 8 hours at 100° C. determined. The results obtained were as follows:

| Composition | A | B | C | D | E |
|---|---|---|---|---|---|
| Epoxy ether resin | 100 | 95 | 90 | 85 | 80 |
| Gamma butyrolactone | | 5 | 10 | 15 | 20 |
| Diethylenetriamine | 3 | 3 | 3 | 3 | 3 |
| Barcol Hardness: | | | | | |
|   2 hrs. at RT | 45 | 45 | 41 | 37 | 22 |
|   2 hrs. at 60° C | 41 | 45 | 43 | 34 | 24 |
| Weight loss after 8 hrs. at 100° C., percent | 0.01 | 0.02 | 0.04 | 0.08 | 0.16 |
| Weight loss after 24 hrs. at 150° C., percent | 0.65 | 0.69 | 1.05 | 1.81 | 2.73 |
| Weight change of cured putty after 18 in boiling water | +1.39 | | +4.88 | | +6.12 |
| Heat Distortion Temperature, ° C. ASTM D-648-56 | 113.5 | 93.0 | 77.0 | 65.0 | 57.0 |

*Example 2*

In order to determine the reduction in viscosity by the addition of γ-butyrolactone to the epoxy ether resin of Example 1, from 0 to 20 parts of the γ-butyrolactone were added per each 100 parts of resin by weight and the viscosity determined at 23° C. by means of the Brookfield viscometer model LVF. The results obtained were as follows.

γ-Butyrolactone:             Viscosity, cps.
  0 _____ 8,260
  5 _____ 2,580
  10 _____ 1,140
  15 _____ 640
  20 _____ 200

The following results were obtained with lactones and dioxanones, using 10 parts of diluent per hundred parts of epoxy resin having an epoxide equivalent of 195. The viscosities were determined at 25° C. using a Gardner-Holdt viscosity comparator.

Diluent:                               Viscosity, cps.
  None _____ 18,000
  2-p-dioxanone _____ 2,500
  ε-Caprolactone _____ 3,000
  γ-Valerolactone _____ 1,800

Similar blends as above were made several times with each and every one of the foregoing lactones and dioxanones with corresponding reductions in the resin viscosity. The results of the numerous blends indicated that the viscosity decreased almost logarithmically proportionally to the amount of the lactone or dioxanone used. In other words, when the blends contained 5 parts of lactone or dioxanone per hundred parts of resin by weight, the viscosity decreased by approximately one-half below the former blend when an additional 5 parts of lactone or dioxanone were added.

*Example 3*

An epoxy ether resin having an epoxide equivalent of 190 was mixed without γ-butyrolactone and with an amount shown below together with the recommended quantity of HET anhydride (hexachloro endomethylene tetrahydrophthalic anhydride). The presence of the γ-butyrolactone in composition B facilitated mixing of the components and effected a more rapid solubility of the HET anhydride into the epoxy resin. The results obtained are as follows:

| Composition | A | B |
|---|---|---|
| Epoxy ether resin, parts | 100 | 100 |
| γ-Butyrolactone, parts | 0 | 10 |
| HET Anhydride, parts | 100 | 100 |
| Cure | (¹) | (¹) |
| Barcol Hardness | 10 | 8 |
| Heat Distortion Temp. ° C. (ASTM D-648-56) | 124.0 | 90.0 |
| Weight change of powdered cured resin after 24 hrs. in boiling water, percent | 11.5 | 5.5 |

¹ 16 hrs. at 60° C., 8 hrs. at 150° C.

*Example 4*

Example 3 was repeated with the exception that 100 parts of the HET anhydride were replaced by 15 parts of m-phenylenediamine. The mixture was then cured for 24 hours at 25° C. followed by 4 hours at 150° C. and the following results obtained:

| Composition | A | B |
|---|---|---|
| Epoxy ether resin, parts | 100 | 100 |
| γ-Butyrolactone, parts | 0 | 10 |
| m-Phenylenediamine, parts | 15 | 15 |
| Initial viscosity of mixture, Cps. at 25° C | >10,000 | >10,000 |
| Cure | (¹) | (¹) |
| Barcol Hardness | 35 | 35 |
| Heat Distortion Temp. ° C. (ASTM D-648-56) | 161.0 | 108.0 |
| Weight change of powdered cured resin after 24 hrs. in boiling water, percent | 3.2 | 3.7 |

¹ 24 hrs. at 25° C., 4 hrs. at 150° C.

*Example 5*

An epoxy ether resin having an epoxide equivalent of 195 was prepared without the presence of γ-caprolactone and with 10 parts thereof containing the recommended amount of boron trifluoridemonoethylene (BF₃MEA) catalyst. After curing, the results obtained were as follows:

| Composition | A | B |
|---|---|---|
| Epoxy ether resin, parts | 100 | 100 |
| γ-Caprolactone, parts | 0 | 10 |
| BF₃MEA, parts | 3 | 3 |
| Cure | (¹) | (¹) |
| Appearance of specimens | (²) | (³) |
| Barcol Hardness | (⁴) | 39 |
| Heat Distortion Temp. ° C | 159.0 | 107.5 |

¹ 2 hrs. at 100° C., 2 hrs. at 150° C.
² Rough, hazy.
³ Smooth, clear.
⁴ Too rough to test.

*Example 6*

To 100 parts of epoxy resin having an epoxide equivalent of 195 were added 10 parts of 2-p-dioxanone and 12.5 parts of diethylenetriamine (DETA). The mixture gelled within 10 minutes at 23° C. and after 24 hours had a Barcol hardness of 38 and a heat distortion temperature (H.D.T.) of 82.5° C.

*Example 7*

To 100 parts of epoxy resin having an epoxide equivalent of 195 was added 10 parts of ε-caprolactone and 12.5 parts of DETA. This mixture gelled within 1 hour at 23° C. and after 24 hours had a Barcol hardness of 34 and an H.D.T. of 78° C.

*Example 8*

A mixture prepared at room temperature and consisting of gram mole of γ-butyrolactone and 1.2 gram moles of diethylenetriamine (DETA) exothermed within 10 minutes to about 90° C. Twenty parts of the amine added were blended at room temperature into 100 parts of an epoxy ether resin having an epoxide equivalent of 190. The blend gelled within 2 hours at room temperature. After 24 hours, the cured resin had a Barcol hardness of 37 and a heat distortion temperature (H.D.T.) of 82° C.

*Example 9*

To 100 parts of an epoxy ether resin having an epoxide equivalent of 195 there were added 10 parts of 2-p-dioxanone and 12.5 parts of DETA. This mixture gelled within 30 minutes at 23° C. and within 24 hours had a Barcol hardness of 40 and an H.D.T. of 93° C.

*Example 10*

To 100 parts of an epoxy ether resin having an epoxide equivalent of 190 there were added 10 parts of γ-valerolactone and 12.5 parts of DETA. This mixture gelled within 20 minutes at 23° C. and within 24 hours had a Barcol hardness of 30 and an H.D.T. of 69° C.

In lieu of the foregoing lactones, I have also found that the various thio derivatives thereof such as thiobuytrolactone, thiovalerolactone, thiocaprilolactone and the like as well as unsaturated lactones such as β-angelica lactone, α-angelica lactone; Δ,β,λ-crotonolactone, and Δ,α,β-crotonolactone, including hydroxy lactones such as δ-arabinolactone, δ-gluconolactone, δ-glucoheptonolactone and γ-glucoheptonolactone, all of which are unstable under acid or alkaline conditions and readily open their ring to yield corresponding amides and thio-amides of hydroxy acids which react with epoxy groups of the epoxy ether resin and become an integral part of the cured resin. In addition, these alternative lactones react at room temperature with any one of the aforementioned aliphatic polyamines to form amine adduct curing agents.

I claim:
1. A composition of matter which undergoes curing in the presence of epoxy ether curing agent comprising a glycidyl polyether of a dihydric phenol having a epoxide equivalent ranging from 140 to 400 containing dissolved therein in an amount ranging from 5 to 20 parts by weight thereof of a dioxanone having the formula:

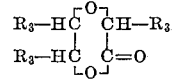

wherein R₃ represents a member selected from the class consisting of hydrogen and methyl groups.

2. A composition of matter according to claim 1 wherein the dioxanone is 2-p-dioxanone.

3. The process of curing a glycidyl polyether of a dihydric phenol having an epoxide equivalent of from 140 to 400 which comprises curing at ambient temperatures the said glycidyl polyether with a curing agent in the presence of from 5 to 20 parts by weight of said glycidyl polyether of a dioxanone having the general formula:

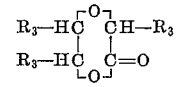

wherein R₃ represents a member selected from the class consisting of hydrogen and methyl groups.

4. The process according to claim 3 wherein the dioxanone is 2-p-dioxanone.

References Cited by the Examiner

UNITED STATES PATENTS

| 2,888,403 | 5/1959 | De Groote et al. | 260—53 |
| 2,893,973 | 7/1959 | Steckler et al. | 260—47 |
| 2,940,982 | 6/1960 | Sullivan | 260—348 |

FOREIGN PATENTS

| 900,751 | 7/1949 | Germany. | |

SAMUEL H. BLECH, *Primary Examiner.*

HAROLD BURSTEIN, *Examiner.*

A. L. LIBERMAN, *Assistant Examiner.*